US007974303B2

(12) United States Patent
Barker et al.

(10) Patent No.: US 7,974,303 B2
(45) Date of Patent: Jul. 5, 2011

(54) METHOD AND SYSTEM FOR PROVIDING BANDWIDTH REQUEST OPPORTUNITIES FOR HIGH PRIORITY SERVICE FLOWS

(75) Inventors: Brian J. Barker, Naperville, IL (US); Greg J. Gohman, Hoffman Estates, IL (US); Jeffrey J Howe, West Chicago, IL (US)

(73) Assignee: ARRIS Group, Inc., Suwanee, GA (US)

( * ) Notice: Subject to any disclaimer, the term of this patent is extended or adjusted under 35 U.S.C. 154(b) by 847 days.

(21) Appl. No.: 11/130,385

(22) Filed: May 16, 2005

(65) Prior Publication Data

US 2005/0254419 A1 Nov. 17, 2005

Related U.S. Application Data

(60) Provisional application No. 60/571,261, filed on May 14, 2004.

(51) Int. Cl.
*H04L 12/403* (2006.01)
(52) U.S. Cl. ...................................... 370/449
(58) Field of Classification Search .................. 370/229, 370/345, 455, 346, 364, 449, 230, 241, 252, 370/468
See application file for complete search history.

(56) References Cited

U.S. PATENT DOCUMENTS

| 4,742,335 | A * | 5/1988 | Vogt ............................... 340/518 |
| 7,006,530 | B2 * | 2/2006 | Spinar et al. ................... 370/468 |
| 7,174,376 | B1 * | 2/2007 | Daruwalla ..................... 709/223 |
| 7,251,232 | B1 * | 7/2007 | Meier ............................ 370/338 |
| 7,286,494 | B2 * | 10/2007 | Kaku et al. ...................... 370/282 |
| 7,499,398 | B2 * | 3/2009 | Damon et al. ................. 370/232 |
| 2002/0090968 | A1 * | 7/2002 | Lee et al. ........................ 455/527 |
| 2004/0060069 | A1 * | 3/2004 | Abramson ..................... 725/110 |
| 2004/0156350 | A1 * | 8/2004 | Brasic et al. ................... 370/346 |
| 2007/0121507 | A1 * | 5/2007 | Manzalini et al. ............. 370/235 |

* cited by examiner

*Primary Examiner* — Kwang B Yao
*Assistant Examiner* — Anh Ngoc Nguyen
(74) *Attorney, Agent, or Firm* — Troy A. Van Aacken; Robert J. Starr

(57) ABSTRACT

Different polling rates are applied to high priority BE service flows depending on whether the service flow contains, or is about to contain, traffic packets. A high priority service flow is identified upon boot-up of a user device, and defaults to a slow polling mode. A trigger causes the service flow to be serviced as a fast polling mode. The fast polling mode lasts for a predetermined period of time. If traffic continues at the end of the predetermined period of time, the predetermined period of time is reset so that the fast-polling mode continues until traffic flow on the high priority service flow ceases.

8 Claims, 2 Drawing Sheets

METHOD AND SYSTEM FOR PROVIDING BANDWIDTH REQUEST OPPORTUNITIES FOR HIGH PRIORITY SERVICE FLOWS

CROSS REFERENCE TO RELATED APPLICATION

This application claims priority under 35 U.S.C. 119(e) to U.S. provisional patent application No. 60/571,261 entitled "Improved operation for high priority signaling," which was filed May 14, 2004, and is incorporated herein by reference in its entirety.

FIELD OF THE INVENTION

This invention relates, generally, to communication networks and devices and, more particularly, to increasing bandwidth request opportunities to competing/contending best effort service flows based on the priority level of the contending flows and the transmission status of the flows.

BACKGROUND

Data-Over-Cable Service Interface Specifications ("DOCSIS") has been established by cable television network operators to facilitate transporting data traffic, primarily internet traffic, over existing community antenna television ("CATV") networks. In addition to transporting data traffic as well as television content signals over a CATV network, multiple services operators ("MSO") also use their CATV network infrastructure for carrying voice, video on demand ("VoD") and video conferencing traffic signals, among other types.

In transporting downstream multimedia content, as well as data, an upstream message, or messages, is/are typically sent to request the content and to set up a service flow to deliver the content. In addition to downstream multimedia content, such as video, voice traffic also uses message signaling to set up service flows for the upstream and downstream directions. This message signaling traffic is bursty over short intervals while setting up and tearing down calls, for example, and is very latency sensitive.

In deployment that combine voice and data on a DOCSIS CMTS, channels are often oversubscribed, and therefore have a tendency at times to be over driven such that some data cannot get through to its destination, and is dropped. Even if message signaling is elevated to higher classification Best Effort ("BE") flows, for example, some packets of these message signals may still get dropped. Furthermore, even if all packets are ultimately received, they likely will be received after significant delay, such delay typically being characterized in the art as latency.

This typically occurs to traffic over channels that have a high percentage of standing calls and a large media terminal adaptor ("MTA") population. Therefore, with control message signal flows classified as BE flows, and since there may be many such flows using the same upstream chancel, there are typically many BE flows vying for a given number of contention intervals during which to make bandwidth request. Thus, some delay will inevitably result due to collisions of requests from competing BE flows for bandwidth.

Thus, there is a need in the art for a method and system for providing adequate bandwidth for high priority traffic, such as message signals, using a BE flow, when requesting bandwidth during set-up of a voice call service flow.

SUMMARY

A method and system for providing high priority traffic with increased bandwidth to reduce latency. A component of a user device, such as a MTA, which also may be referred to as an embedded MTA ("EMTA"), contained within a cable modem sends upstream traffic in a configurable service flow. The CMTS to which the user device is connected determines that this service flow should be mapped to a high bandwidth classification. A trigger informs the CMTS that traffic on the service flow is imminent. Upon becoming aware of the trigger, the CMTS allocates bandwidth request opportunity resources to the service flow according to predetermined criteria. Accordingly, if evaluation of the predetermined criteria detects that a high priority service flow (or flows) is vying for bandwidth, the number of bandwidth request opportunities will be increased based on the trigger. Thus, fewer collisions between the high priority service flow and other service flows will occur, thereby reducing the delay, or latency, before bandwidth request(s) is/are granted.

To identify that a service flow is designated as a high priority service flow, the user device may be configured so that traffic flows emanating from the MTA are recognized by the CMTS to which it is connected as carrying high priority traffic. Alternatively, a type length value ("TLV") variable may be used to identify a flow from a user device such that the CMTS recognizes the high priority flow as such. Or, a heuristic algorithm running at the CMTS may analyze flow priorities and classifiers to determine which flows will carry high priority traffic such as dynamic service request ("DSx") messaging or network call signaling ("NCS") signals.

When a high priority bandwidth service flow has been identified, a trigger is used to initiate application of the increased bandwidth request opportunities. The trigger may be mapped within the CMTS to a particular user device, and thus used to predict that high priority traffic from the user device is likely imminent. If high priority traffic does not in fact begin within a predetermined time lapse after receipt at the CMTS of the trigger, then the resources may be allocated to other service flows. If high priority traffic from the user device associated with the traffic flow and initiated by receipt of the trigger has already begun, then the trigger may be used to predict that high priority traffic will continue for some time. If this is the case, the lapse period may be reset on the assumption that the high priority flow will likely continue. If after a reset, high priority traffic does not continue, then the resources may be allocated to other resources.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
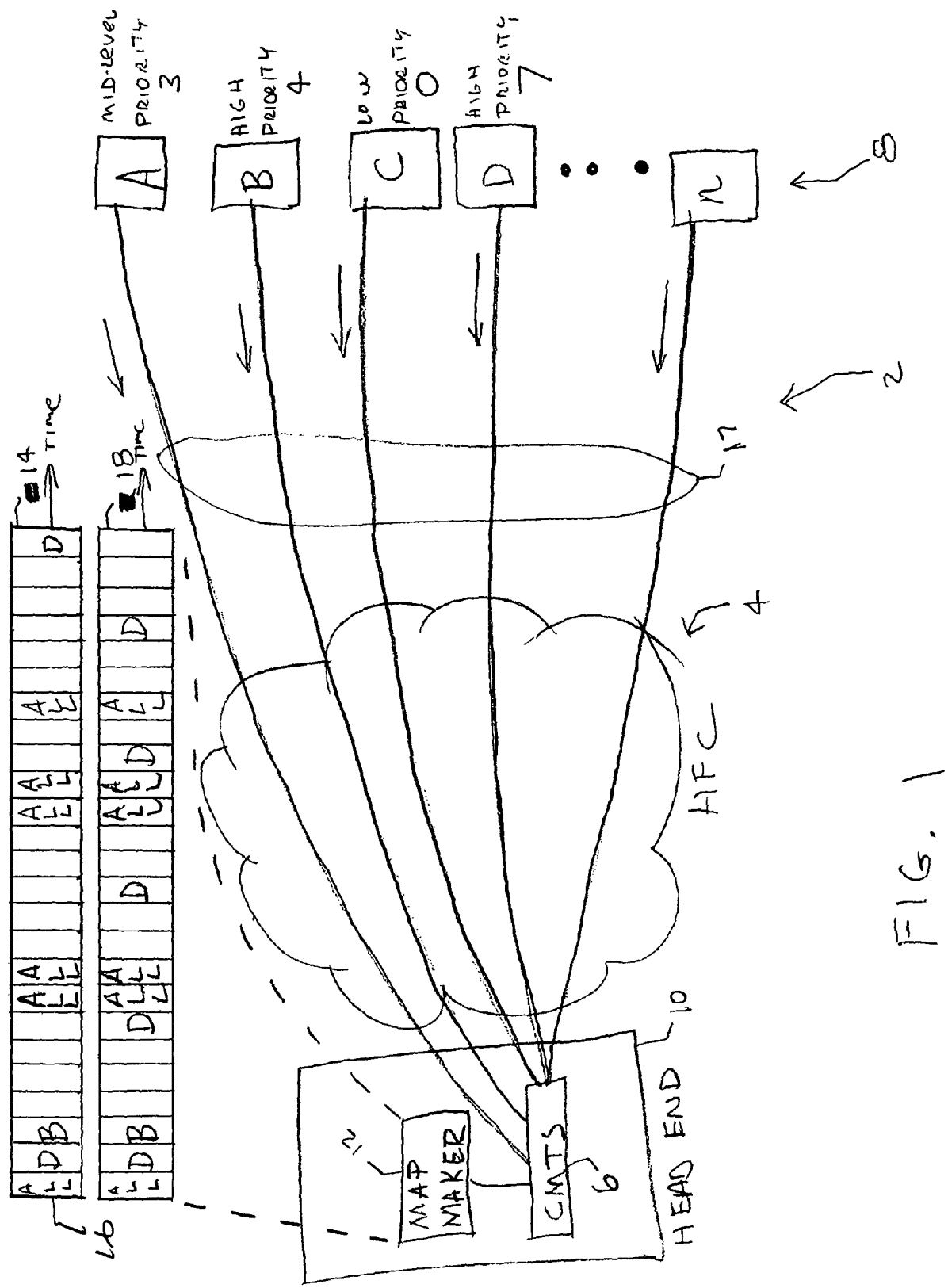
FIG. 1 illustrates user devices connected to a CMTS over an HFC network.

Turning now to the figures, FIG. 1 illustrates a system 2 for providing communication over an HFC network 4 between a cable modem termination system ("CMTS") 6 and a plurality of user devices 8, such as, for example, cable modems. CMTS 6 is typically located at a head end location 10 operated by a multiple services operator ("MSO"). At the head end 10, mapmaker 12 schedules upstream bandwidth traffic packets into slots, sometimes referred to as minislots. The slots represent an opportunity for a user device 8 to transmit packet data, with all user devices sharing the available timeslots based on the mapmaker granting opportunities for the user devices to transmit. The number of time slots available per unit time corresponds to the available bandwidth on an upstream channel of network 4, and a slot is used to transmit packet data corresponding to a service flow of a user device.

Such scheduling of service flow data transmission is known in the art and is used to provide an orderly transmission scheme for upstream data. A first scenario is depicted by the sequence of slots 14 scheduled by mapmaker 12. The first slot 16 is shown with the term 'ALL' to indicate that all user devices can compete for upstream transmission with each other for an opportunity to transmit a broadcast message (packet data). With the second slot begins a series of slots providing opportunities for upstream unicast transmission to the user devices 8. For example, after the broadcast opportunity, device D is provided a unicast poll opportunity. This opportunity provided to D is followed by a unicast poll opportunity to B. It is noted that device 8A and 8C are not specifically provided with upstream unicast poll opportunities, and, thus typically rely on broadcast and other opportunities for transmitting upstream traffic.

First scenario 14 also illustrates additional broadcast opportunities and a number of blank slots. It will be appreciated that these blank slots represent slots that are not dedicated to providing BE unicast polling opportunities, which may also be referred to as a bandwidth request, to the user devices 8 shown, but are reserved for other purposes, including providing broadcast opportunities, which are available to all of the user devices. In addition, these slots represented by blanks in the figure may also function as time keepers or place holders, and represent unused bandwidth on a network channel. Thus, the blank slots in scenario 14 represent slots with the potential for providing more BE upstream unicast polling opportunities to the user devices 8 that are already being allocated some slots for unicast polling opportunities.

In the figure, user devices A, B, C and D have upstream service flows 17 that are configured to BE priority levels 3, 4, 0 and 7, respectively. These priority level numbers refer to levels within the eight-priority-level BE upstream transmission scheme known in the art. Within this priority level scheme, priority 0 is specified to be the lowest priority and priority 7 is specified to be the highest priority. These priority levels represent assignments from CMTS 6 based on traffic type that the corresponding service flow is set to transmit. For example, internet data traffic may be assigned to a priority level of 0, but a flow from a user device that is an MTA for sending voice traffic may be assigned a higher priority level of 7. First scenario 14 illustrates that devices 8D and 8B are provided unicast poll opportunities for bandwidth requests in slots 2 and 3 respectively. As discussed above, other slots are blank and/or broadcast opportunities, and slot 25 is allocated to device 8D. It will be appreciated that scenario 14 illustrates only twenty-five slots of a continuous stream of opportunities. Thus, if more slots to the right of scenario 14 were shown, slot 26 might be allocated as a broadcast opportunity with the pattern shown in the slots 2-25 repeating thereafter The scheduling of slots as depicted in first scenario 14 may represent a situation where the high priority BE flows (i.e., 17B and 17D) are in a 'slow polling' mode. In a slow polling mode, BE unicast poll opportunities are provided to a given service flow 17 at a certain rate. This rate may be defined by the interval between successive polling opportunities, inasmuch as the smaller the interval between the providing of polling opportunities, the higher the number of bandwidth request opportunities being provided to that service flow in a given amount of time. Slow polling mode is typically active when a service flow has been established, but there have been no recent bandwidth requests from the given service flow.

Thus, unicast poll opportunities are provided such that when a given user device 8 has a need to transmit high priority traffic, an opportunity will eventually be presented to the device. But, the rate at which upstream bandwidth request opportunities are made available is at a default minimum so as not to 'tie up' bandwidth request opportunities that could otherwise be used for other device. Thus, this scheme balances providing upstream bandwidth opportunities with efficient use of available resources when upstream bandwidth requests are not actually being made.

However, once a trigger is received over a service flow 17 that has been established as high priority, the polling is switched from slow to fast. A trigger may occur when a bandwidth request is made using slots allocated in the slow polling mode, for example; these requests could also be received in a broadcast opportunity. In a fast polling mode, service flows 17 having high priority are given more upstream bandwidth request opportunities in a given amount of time. Thus, the request opportunity rate is higher—the interval between opportunity requests is shorter. Consequently, less time elapses between a user device attempting to transmit a bandwidth request and the actual granting of a bandwidth request than would typically occur in the slow polling mode.

This is illustrated in second scenario 18 by the graphical representation depicting the scheduling of user device 8D in fast polling mode. There are fewer blank slots shown, as some of the blank slots shown in scenario 14 have been used to provide more upstream unicast poll opportunities to device 8D after a trigger activated the fast polling mode for service flow 17D. As discussed below in reference to FIG. 2, the rate of opportunities presented to device 8D shown in second scenario 18 is about five times what it is in the slow polling mode shown in first scenario 14. In second scenario 18, since a trigger has not been received for service flow 17B, it remains in slow polling mode, which is represented in the figure that shows the same number of slots allocated to device B in both first scenario 14 and the second scenario. To prevent fast polling mode from remaining active when no traffic data is being sent, a timeout parameter is used to toggle back to slow polling mode when a bandwidth opportunity has not been used during the timeout period. The timeout period is discussed in greater detail in reference to FIG. 2.

Figure 2:
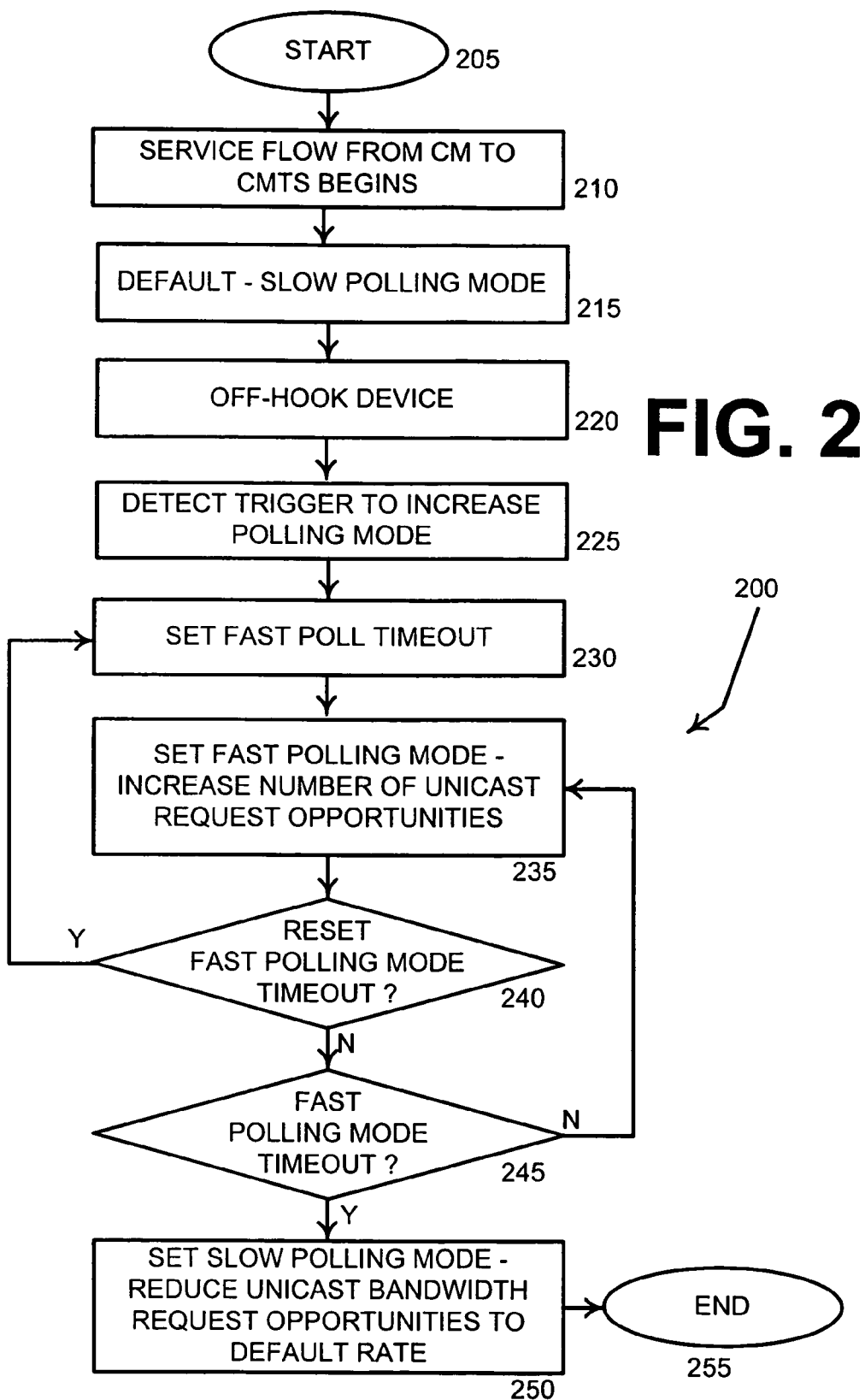
FIG. 2 illustrates a method for allocating bandwidth request resources to high priority traffic.

Turning now to FIG. 2, a flow diagram illustrates a method 200 for allocating requested bandwidth resources to high priority BE traffic flows. Method 200 starts at step 205. At step 210, a user device boots up and predetermined service flows are established between the user device and CMTS. Such service flows may be configured to correspond to data traffic, voice traffic, video traffic, etc. respectively. Furthermore, the user device, such as a cable modem, for example, may be configured so that the CMTS recognizes that a given service flow from the user device corresponds to one of these predetermined types of traffic.

After the modem has booted up, even service flows that may ultimately carry high priority traffic typically default to operate in a slow polling mode at step 215. A polling mode refers to how many polling opportunities are presented to a given service flow. These opportunities are used for establishing a bandwidth grant in response to a unicast transmission request to transfer information between the user device and the CMTS at a head end. This provides unicast request opportunities periodically which only a given user device/cable modem's service flow can use to make bandwidth requests for sending data packets upstream to the CMTS. In a slow polling mode, there is more time, (i.e., greater interval) between each presented opportunity as compared to a fast polling mode, thus fewer opportunities per unit of time than in a fast polling mode.

As an example, a given service flow may be designated as being for voice traffic—a cable modem is configured so that voice traffic is over a specific service flow, and the CMTS to which the modem is connected is configured to recognize this service flow as containing voice traffic. When a user places his or her telephony hand set 'off-hook' at step 220, a trigger is sent over the given service flow that high priority traffic may be imminent. Such a trigger may include a bandwidth request, such as, for example, a PacketCable DQoS Gate message that can be mapped to a particular MTA and thus to a particular user device. Another trigger may be a Dynamic Service Changes request ("DSx"). The receipt of either of the trigger examples at the CMTS is used to predict that further data is being, or about to be sent. As discussed above in reference to FIG. 1, it will be appreciated that a priority level may be assigned to a service flow, preferably in accordance with the DOCSIS BE levels 0-7, with higher priority numbers corresponding to higher priority traffic.

When the CMTS detects the trigger at step 225, an increased opportunity schedule assigns more bandwidth request opportunities per unit time to the requesting service flow for a predetermined period of time at step 230. This predetermined period time may be referred to as a fast polling mode timeout period, corresponding to a predetermined fast polling timeout value, during which time the service flow over which the trigger was received is presented with more bandwidth request opportunities than during the slow polling mode. The fast polling timeout value may be implemented in a counter, or other similar way of implementing a timer, as known in the art.

After the fast polling timeout value is set at step 230, more bandwidth request opportunities per unit time, as compared to the slow polling mode, are assigned to the service flow corresponding to the trigger at step 235. Thus, during the fast polling timeout period, the likelihood of a high priority service flow being granted an upstream unicast stream increases. Based on the priority level 0-7 of the service flow, the number of unicast bandwidth request opportunities may vary. For example, Table 1 below illustrates fast and slow polling interval values and timeout period values for DOCSIS priority levels 0-7. Higher priority levels have smaller intervals between unicast bandwidth request opportunities, in the slow and fast polling modes, as shown in Table 1, in which time values are given in terms of tens of milliseconds. (Note: A Slow Interval or Fast Interval setting of zero (0) indicates that no unicast polls are offered to service flows with these Slow Priority levels). It will be appreciated that these time values are only representative, and can vary up or down according to the needs of the multiple services operator ("MSO") that operates the CMTS.

TABLE 1

| SLOW PRIORITY | SLOW INTERVAL | FAST INTERVAL | TIMEOUT PERIOD |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 125 | 25 | 500 |
| 5 | 100 | 20 | 500 |
| 6 | 75 | 15 | 500 |
| 7 | 50 | 10 | 500 |

Although priority levels 4-7 are given unicast request opportunities, it is preferable that service flows having these priority levels also be provisioned to use broadcast opportunities via the Request/Transmission Policy provisioned for each service flow. Thus, even more bandwidth request opportunities are present when the system is operating in slow polling mode, and therefore, the delay in a trigger being acknowledged at the CMTS is reduced.

After the number of bandwidth request opportunities has been increased upon commencement of the fast polling mode at step 235, algorithm 200 determines whether an action to reset the fast polling mode timeout value has occurred at step 240. If so, algorithm returns to step 230, and the timeout counter/timer is reset to correspond to the priority-appropriate timeout value given in Table 1. If algorithm 200 determines at step 240 that action to reset the timeout value has not been received, the algorithm continues to step 245, at which point it is determined whether the timeout period has expired. If not, algorithm 200 loops back to step 235, and the more frequency intervals of the fast polling according to Table 1 continues. If at step 245 the fast polling mode timeout period has expired, the polling mode made available to the service flow from the cable modem is reset to slow mode at step 250. Algorithm 200 ends at step 255.

It is noted that in Table 1 above, unicast opportunities are not assigned to service flows having priority levels 0-3, because the interval would be so large as to not provide much, if any, benefit over obtaining a grant of a broadcast opportunity. Accordingly, service flows 0-3 are preferably assigned broadcast bandwidth request opportunities only. For the higher priority designations, it is also noted that slow to fast polling intervals are configured in a 5:1 ratio in Table 1. However, this ratio can be configured in any ratio, with various interval periods as determined by MSO traffic engineering analysis, for example.

Tables 1 preferably refers to the contents of a portion of a management information base ("MIB"). MIBs are known in the art for storing objects that can be monitored by a network management system. Thus, the programmable MIB associated with a given service flow contains data corresponding to particular parameters that are used in the operation and control of the service flow by the CMTS. Accordingly, instead of merely associated more unicast opportunities with higher priority BE flows, for example, the MIB objects may be used in conjunction with algorithm 200 to toggle between a slow and fast polling mode for a given BE priority level based on a trigger detected on the service flow.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for providing bandwidth to high priority service flows, comprising:
    configuring one or more pieces of network equipment to associate a high priority service flow with a predetermined type of traffic;
    configuring the one or more pieces of network equipment to detect initiation of the high priority service flow;
    configuring the one or more pieces of network equipment to detect imminent traffic flow within the high priority service flow;
    configuring the one or more pieces of network equipment to transition from a slow polling mode to a fast polling mode upon detection of imminent traffic flow within the high priority service flow; and
    configuring the one or more pieces of network equipment to monitor the traffic activity over the high priority service flow and transitioning from the fast polling mode to a slow polling mode after a predetermined timeout period has elapsed if traffic over the high priority service flow has ceased.

2. The method of claim 1 wherein the predetermined type of traffic is voice traffic.

3. The method of claim 1 wherein the associating of the high priority service flow with information corresponding to a predetermined type of traffic includes configuring a CMTS to recognize the high priority service flow and to recognize that this high priority service flow will be carrying the predetermined traffic type.

4. The method of claim 1 wherein imminent information transport within the high priority service flow is detected based on a trigger.

5. The method of claim 4 wherein the trigger includes a QoS Gate message.

6. The method of claim 4 wherein the trigger includes a DSx request.

7. The method of claim 1 wherein the fast polling mode includes granting intervals during which to make unicast requests more frequently than a slow polling mode.

8. The method of claim 1 further comprising renewing the fast polling mode before transitioning from the fast polling mode to the slow polling mode occurs.

* * * * *